US008779980B2

(12) United States Patent
Yule et al.

(10) Patent No.: US 8,779,980 B2
(45) Date of Patent: Jul. 15, 2014

(54) POSITION VALIDATION

(75) Inventors: Andrew Thomas Yule, Reigate (GB); Christopher Brian Marshall, Reigate (GB)

(73) Assignee: U-Blox A.G., Thalwil (CH)

( * ) Notice: Subject to any disclaimer, the term of this patent is extended or adjusted under 35 U.S.C. 154(b) by 109 days.

(21) Appl. No.: 13/267,827

(22) Filed: Oct. 6, 2011

(65) Prior Publication Data

US 2013/0082872 A1    Apr. 4, 2013

(30) Foreign Application Priority Data

Sep. 30, 2011   (EP) ..................................... 11183439

(51) Int. Cl.
*G01S 3/02*   (2006.01)
*G01S 19/42*   (2010.01)

(52) U.S. Cl.
USPC ..................................... 342/451; 342/357.25

(58) Field of Classification Search
USPC .............. 342/357.2, 357.25, 357.4, 450, 451; 702/179, 181
See application file for complete search history.

(56) References Cited

U.S. PATENT DOCUMENTS

| | | | |
|---|---|---|---|
| 5,621,793 | A | 4/1997 | Bednarek et al. |
| 7,084,809 | B2 | 8/2006 | Hockley, Jr. et al. |
| 7,471,954 | B2 | 12/2008 | Brachet et al. |
| 7,561,101 | B1 | 7/2009 | Tester et al. |
| 7,941,379 | B1 | 5/2011 | Newstadt et al. |

| | | | |
|---|---|---|---|
| 2006/0036399 | A1* | 2/2006 | Yang et al. .................... 702/181 |
| 2006/0270421 | A1 | 11/2006 | Phillips et al. |
| 2009/0009397 | A1 | 1/2009 | Taylor et al. |

FOREIGN PATENT DOCUMENTS

| | | |
|---|---|---|
| DE | 10044393 | 4/2002 |
| WO | WO 2009/000842 A1 | 12/2008 |
| WO | WO 2010/032057 A1 | 3/2010 |

OTHER PUBLICATIONS

Kray, Christian et al., "Interactive Positioning based on Object Visibility," *Mobile Human-Computer Interaction—MobileHCI 2004*, Sep. 13, 2004-Sep. 16, 2004, Glasgow, UK, 12 pages.
Nokia Beta Labs—User Assisted GPS: Suggestions/Routing/User Assisted GPS. http://betalabs.nokia.com/apps/ovi-maps-beta-for-mobile/suggestion/9068/user-assisted-gps., May 10, 2011, 3 pages.
Roth, Jorg, "Inferring Position Knowledge from Location Predicates," Edited by J. Hightower et al., *LoCA 2007*, LNCS 4718, 2007, pp. 245-262.

(Continued)

*Primary Examiner* — Dao Phan
(74) *Attorney, Agent, or Firm* — Blakely Sokoloff Taylor & Zafman

(57) ABSTRACT

A method of determining an indication of the position of an electronic device. The method includes: obtaining (100) information relating to a radio signal received by the device. The received radio signal are transmissions from one or more satellites of a satellite-positioning system from which information an inference can be made about the true position of the device at the time the signal was received. The method also involves obtaining (110) a plurality of hypotheses about the true position of the device; and evaluating (120, 130, 140) the plurality of hypotheses by assessing a degree of consistency between the information relating to the radio signal and the hypotheses. Using the outcome of the evaluations, the method also includes selecting (150) one or more of the hypotheses; and outputting (160) an indication of the selected one or more hypotheses.

13 Claims, 2 Drawing Sheets

(56) References Cited

OTHER PUBLICATIONS

Dehghanian, Vahid, "Generalized Diversity Gain of a Mobile Antenna," Ph.D. Thesis, Department of Electrical and Computer Engineering, University of Calgary, Alberta, Canada, Apr. 2011.

Examination Report received in connection with the EP counterpart application, No. 11 183 439.6-1811, filed Sep. 20, 2013, 3 pages (Form 2906).

* cited by examiner

POSITION VALIDATION

BACKGROUND OF THE INVENTION

1. Field of the Invention

This invention relates to satellite positioning systems. More particularly it relates to a method and apparatus for determining information about the position of a satellite-positioning receiver by hypothesis validation.

2. Description of Related Art

Satellite positioning systems of various kinds are known in the art. These are also known as Global Navigation Satellite Systems (GNSS). A well known example of such a system is the Global Positioning System (GPS). Other examples include the European Union's Galileo system and the Russian system GLONASS.

These systems all work on similar principles. A uniquely identifiable signal is transmitted by each satellite, with precise synchronisation. A receiver detects signals from multiple different satellites and measures their relative times of arrival. The differences among the times of arrival correspond to the different distances from each satellite to the receiver. By establishing its relative distance from enough satellites and knowing the position of each of those satellites, the receiver is able to determine its own position by trilateration.

BRIEF SUMMARY OF THE INVENTION

Satellite positioning requires relatively complex hardware and computational processing to determine a position. A satellite positioning receiver must be able to detect very weak satellite signals with very high accuracy. In general, it may be slow and energy intensive to explicitly determine a precise position.

According to an aspect of the present invention there is provided a method of determining an indication of the position of an electronic device, the method comprising:

obtaining information relating to a radio signal received by the device, the radio signal comprising transmissions from one or more satellites of a satellite-positioning system, from which information an inference can be made about the true position of the device at the time the signal was received;

obtaining a plurality of different hypotheses about the true position of the device;

evaluating the plurality of hypotheses, comprising assessing a degree of consistency between the information relating to the radio signal and the hypotheses;

based on the outcome of the evaluations, selecting one or more of the hypotheses; and outputting an indication of the selected one or more hypotheses.

This represents a substantially different approach to the problem of determining position. Instead of asking the question "where am I?", the question can be asked "am I at position A or position B?". The response can be an indication of which is more likely to be the true position. (Note that more than one position may be returned, if these are equally likely to be the true position.)

This may be useful, for example, when a device is configured to operate in different ways (for example, different modes) according to its location. For example, a mobile phone may be configured to automatically route personal calls (from friends and family) to voicemail, when the user of the phone is at his/her workplace. For such applications, having a precise position fix is not necessary—it may be sufficient to know if the hypothesis "at work" is more likely to be true than false.

Formulating the positioning problem in this way can remove some of the processing burden. With this approach, there may be greater flexibility in the methods used to determine position. It may not be necessary to perform all of the calculations which would usually be needed to uniquely determine a position. Instead, it may be possible to quickly select the most likely candidate (or candidates) while minimizing computational effort and power consumption. This may lead to increased battery-life in portable devices or conversely, reduced cost and/or weight for the same battery-life.

Another advantage is that it may be possible to provide a useful positioning function despite limited quality or availability of positioning signals. For example, it may be possible to distinguish between position hypotheses based on as little as one or two satellite signals. In general, conventional satellite positioning requires sufficiently strong signals from at least four satellites.

The formulation of the question "am I at position A or position B?" may also be beneficial for protecting privacy— position is only validated; therefore the information revealed is minimized. It is not necessary to reveal the address or exact geographic coordinates of position A or position B. Acceptance of the hypothesis "position A" does not necessarily mean that the electronic device is precisely at a unique position A—only that it has been determined that the electronic device is more likely to be at position A than at the other position B. For example, a point-hypothesis at the centre of London will match better than a point-hypothesis at the centre of Zurich, even if the device is located at Heathrow airport, at the edge of London.

Preferably therefore, in some applications, the locations associated with the plurality of hypotheses are not output by the method. Likewise, the plurality of hypotheses may be input to the method in the form of logical labels, such as "my home" and "my office". These labels may be pre-associated, in a memory, with geographic locations, which enables the hypotheses to be evaluated. The memory may be encrypted or otherwise protected, so that the locations are not accessible externally. Thus, in an electronic device using a method according to the present invention, the user interface may be operable only for the input and output of logical labels for the hypotheses. Actual geographical coordinates for the locations are thus hidden from the user.

Note that the position determined may be the current position of the electronic device or a historical position that is determined retrospectively.

Preferably, the step of evaluating the plurality of hypotheses comprises evaluating each hypothesis to at least some extent.

The information relating to the radio signal may comprise part of the radio signal itself, a message extracted (decoded) from the signal, or measurements made from the signal. More particularly, the information may comprise a digitally sampled segment of the signal, optionally after down-conversion to an Intermediate Frequency (IF), or may comprise ranging measurements (such as a code-phase of a spreading code, or a pseudorange). The intermediate frequency may be zero or non-zero. The information may also comprise information explicitly identifying one or more satellites whose transmissions are detectable in the radio signal. In each case, the information either implicitly or explicitly captures identifying characteristics of the position at which the radio signal was received.

The degree of consistency between the information and the hypothesis may be assessed by comparing the information that has been obtained with the information which was expected—for example, by comparing predicted values with actual, measured values. Here "consistent" means that the information is compatible with the hypothesis being true.

The one or more hypotheses that are selected may be those that are determined to be: most likely to be true; or least likely to be false.

One or more hypotheses may be deemed most likely to be true based on positive (confirmatory) evidence that supports the (or each) hypothesis. Hypotheses may be deemed least likely to be false due to an absence of negative (contradictory) evidence that would deny the (or each) hypothesis.

In other embodiments, the one or more hypotheses selected could be those which are least likely to be true or most likely to be false. This "negative" information can still provide a user (or a software application) with useful information about the position of the electronic device. The negative selection may be the selection of the one or more position hypotheses for which there is most evidence that the hypothesis is likely to be false, and the least evidence that it is likely to be true. For instance, in the case of two hypotheses, "at home" and "at the hospital", the method can usefully output the negative indication that the device is "not at the hospital", if the available evidence contradicts that hypothesis.

The step of evaluating the plurality of hypotheses may comprise searching the signal to detect transmissions from at least one satellite, wherein at least one parameter of the search is dependent on at least one of the hypotheses.

That is, the position information provided by the hypothesis may be used to guide the search. For example, for a parameter which has a numerical value, a starting point for the search and/ore search-range may be chosen based on the candidate position.

Optionally, at least one parameter of the search is chosen in dependence upon two or more hypotheses. For example, a search parameter may be chosen because it has the potential to confirm or reject multiple hypotheses or to discriminate between hypotheses or disjoint sets of hypotheses. The operation of the method may be modified if any one of the two or more hypotheses changes.

During the search, priority may be given to detecting a transmission from a satellite which is predicted to be detectable at a position according to a first one of the plurality of hypotheses.

This may comprise trying to detect the expected source(s) before trying to detect any other source. Alternatively or in addition, it may comprise expending greater effort in searching for an expected source, as compared with other sources—for example, by increasing an integration time of a correlation-based search for an expected source.

During the search, priority may be given to detecting a transmission from a satellite which is predicted not to be detectable at a position according to a second one of the plurality of hypotheses.

This may be understood as an attempt to disprove the second hypothesis. If a satellite transmission is received from a satellite that was below the horizon at one or more positions associated with the second hypothesis, it is strong evidence that that hypothesis is false.

Optionally, priority may be given to detecting a satellite which is predicted to be detectable, under a first hypothesis, and not detectable, under a second hypothesis. This means that the presence or absence of that satellite signal is a powerful discriminator between the two hypotheses.

Prioritisation approaches such as these may help to reduce the computational effort, energy, and/or time needed to evaluate the hypotheses and reach a conclusion.

The at least one parameter of the search preferably comprises at least one of: a predicted frequency of a transmission from the at least one satellite; a predicted Doppler shift of such a predicted frequency; a known spreading code used by the at least one satellite; a predicted timing with which a signal transmitted by the at least one satellite is received; a predicted signal strength with which such a signal is received; and a predicted pattern of bits in the data message of the at least one satellite.

A timing with which a satellite-signal is received may be represented either as a timing measurement or a ranging measurement, because time of arrival is inherently linked to range from the satellite to the receiver.

A ranging measurement may comprise, for example, a code-phase, carrier-phase, or pseudo-range measurement. In general a ranging measurement is a value which (implicitly or explicitly) provides some information about a distance from the satellite positioning receiver to one satellite among the constellation of positioning-satellites. A ranging measurement may be a represented by a distance or by a time-of-flight or time-of-arrival of a signal. Many types of ranging measurements are not absolute or unique measurements—they typically incorporate some degree of relativity or ambiguity. For example a code-phase measurement, by itself, specifies (relative) time-of-arrival by reference only to a single code-epoch (that is, within one complete repetition of the spreading code). There remains an ambiguity about which code-epoch and which data bit-period of the satellite data message is being observed. (The data bit period is 20 complete repetitions of the code—that is 20 times longer than the code-epoch.) The term "ranging measurement" should therefore be understood to include both measurements including some degree of ambiguity as well as absolute and/or unique distance measurements. Likewise, the timing of the bit-edge or position in the data message can be seen as ranging measurements, because they reduce the ambiguity and can contribute to the derivation of a pseudorange—for example, by combining them with a code-phase measurement.

A predicted signal strength with which a signal is expected to be received can be used as a search parameter, for example, by choosing the integration time so that it is suitable for detecting a signal at the predicted power. Signal strength or power may be represented by Signal-to-Noise Ratio (SNR).

The step of evaluating the plurality of hypotheses may comprise: predicting (120) the value of at least one parameter of the received radio signal, based on at least one of the hypotheses; and comparing (140) the predicted value with a corresponding measured value of the parameter.

The comparison may comprise one or more of: calculating a difference between the predicted value and the measured value; and evaluating one or more equations to determine whether the measured value is consistent with the predicted value. Preferably, the comparison is performed between two or more values.

As above, the at least one parameter predicted and measured may comprise at least one of: a predicted frequency of a transmission from the at least one satellite; a predicted Doppler shift of such a predicted frequency; a known spreading code used by the at least one satellite; a predicted timing with which a signal transmitted by the at least one satellite is received; a predicted signal strength with which such a signal is received; and a predicted pattern of bits in the data message of the at least one satellite.

The step of evaluating the plurality of hypotheses optionally further comprises, before predicting the value of the at least one parameter: comparing the hypotheses in order to determine which of a plurality of parameters is most likely to discriminate among the hypotheses; and choosing the at least one parameter to be predicted according to the result of the determination.

In this way an initial assessment is provided of how best to discriminate among the various different hypotheses. For example, if a first hypothesis predicts that satellites A and B will be visible; and a second hypothesis predicts that satellites A and C will be visible, there is little point searching for transmissions from satellite A—the presence or absence of the transmissions will not help to discriminate between the hypotheses. In this example, the method may compare the hypotheses, determine that satellite A is common to both and prioritise the search for the other satellites (B and C), which are unique to at least one hypothesis.

Assessing the hypotheses in advance in this way may help to reduce the computational effort, energy, and/or time needed to evaluate the hypotheses.

Each hypothesis may have associated with it a prior probability that it is true; and the step of evaluating the plurality of hypotheses may comprise evaluating the hypothesis with the highest probability first.

On average, assessing more likely hypotheses before less likely hypotheses should lead to a reduction in the time taken to reach a conclusion. If the evidence supports the first-evaluated hypotheses, less effort can be devoted to testing the other, less likely, hypotheses. Furthermore, if evidence is quickly encountered against a first-evaluated, a-priori most likely hypothesis, then the evaluation of this hypothesis can be terminated, and resources can be directed instead to evaluating the other (a-priori less likely) location hypotheses. This again improves effectiveness and speed in finding the matching location hypothesis.

Preferably, in the plurality of hypotheses, one of the hypotheses is the most recently determined position of the device (that is, the last known position). More preferably, each hypothesis has associated with it a prior probability that it is true (as described above) and the hypothesis of the most recently determined position is assigned the highest probability.

In other words, the most recently determined position is preferably one of the hypotheses and it is preferably the hypothesis evaluated first. This reflects the belief that the device has not moved since the position was last determined.

The one or more hypotheses most likely to be true can be selected and output before a complete position fix has been calculated from the radio signal.

This may comprise selecting and outputting the most likely hypotheses without ever calculating a position fix. Alternatively, it may comprise calculating a position fix later, after the selection and output of hypotheses.

The step of outputting an indication of the selected one or more hypotheses may further comprise outputting at least one of: a first value indicating the likelihood that the hypothesis is true; a second value indicating the likelihood that the hypothesis is false; and a third value indicating the relative magnitudes of the first and second values.

The first and second values may comprise probability values. The second value may be a probability value for the negative hypothesis—that is, the hypothesis that the electronic device is not (or was not) located at a position according to the hypothesis. The third value may be a likelihood ratio, for example. Alternatively or in addition, the method may comprise outputting an indication of the likelihood that none of the plurality of hypotheses is true. This may be considered a "null hypothesis".

A likelihood associated with a given hypothesis may be expressed independently of the prior probability of the hypothesis being true. Alternatively, if it is known (or can be estimated) then the prior probability of the hypothesis may also be taken into account, to produce a posterior probability of truth.

Factors such as prior probability and the likelihood of other hypotheses can be taken into account by using a comparison function, to select, combine, and/or manage the analysis of each hypothesis.

The plurality of hypotheses may comprise at least three hypotheses, one of which is a null hypothesis that represents the possibility that none of the other hypotheses is true.

In this case, if the null hypothesis is selected as the hypothesis most likely to be true (or least likely to be false), the method preferably further comprises processing satellite signals to calculate a position fix.

In this variation of the method, a full position fix is calculated if and only if the hypothesis testing approach reveals that the electronic device is located at none of the hypothesised positions. This may imply that the electronic device is located at a new, previously unseen location. It may then be advantageous to calculate a position fix in a conventional manner, in order to determine the new location.

With this method, the position of the electronic device can be established quickly and with minimal effort if it is at one of the hypothesised (familiar) locations. However, on the occasions when this computationally efficient approach fails to provide an answer, the device reverts to conventional GPS processing techniques (which will typically be more computationally intensive). Overall, this should allow the device reduce energy consumption, compared with a device which always uses conventional processing.

Each hypothesis may comprise at least one of: a position in two or more spatial dimensions; a set of positions; and a range of positions.

The hypothesis may therefore define a unique location; or an area or region, such as a town; state; or country. An area may be defined by a set of positions—for example, by treating the positions as points defining the convex hull of the area. Alternatively, an area may be defined by a range of positions, such as a rectangular range in two dimensions or a central position combined with a radius. A single hypothesis may include disjoint locations. In other cases, two or more hypotheses may overlap. For example, one hypothesis may be a more specific version of another, such that they have a hierarchical relationship. That is, one hypothesis may be associated with a subset of the locations associated with the other. For instance "the United Kingdom" may be one hypothesis and "London" may be a more specific sub-hypothesis.

The hypothesis may further include a time at which the electronic device is believed to have been present at the candidate position. For example, the time may refer to the time instant or interval in which the radio signal was received.

Evaluating a hypothesis may comprise determining that the information relating to the radio signal either contradicts or supports the hypothesis. Determining that the information contradicts the hypothesis may comprise one or more of: determining that a transmission from a satellite that was not predicted to be detectable at the candidate position is detected in the radio signal; and determining that a transmission from a satellite that was predicted to be detectable at the candidate position in the radio signal is not detected in the radio signal.

Also provided is a computer program, comprising computer program code means adapted to control a physical computing device to perform all of the steps of a method as described above, if said program is run on a computer; and such a computer program embodied on a computer readable medium.

According to another aspect of the invention, there is provided apparatus for determining an indication of the position of an electronic device, the apparatus comprising:

a satellite positioning receiver (10, 12, 18), operable to receive a radio signal, the radio signal comprising transmissions from one or more satellites of a satellite positioning system;

an input (26), for obtaining a plurality of hypotheses about the true position of the device; and a processor (20), adapted to:

evaluate the plurality of hypotheses, comprising assessing a degree of consistency between the received radio signal and the hypotheses;

based on the outcome of the evaluations, select one or more of the hypotheses; and output an indication of the selected one or more hypotheses.

The processor may be further adapted to process at least one radio signal received by the satellite positioning receiver, in order to extract information which characterises the true position of the device at the time the signal was received, and wherein the processor is adapted to evaluate each hypothesis by assessing a degree of consistency between the information extracted from the radio signal and the hypothesis.

BRIEF DESCRIPTION OF THE DRAWINGS

The invention will now be described by way of example with reference to the accompanying drawings, in which.

DETAILED DESCRIPTION OF THE INVENTION

Figure 1:
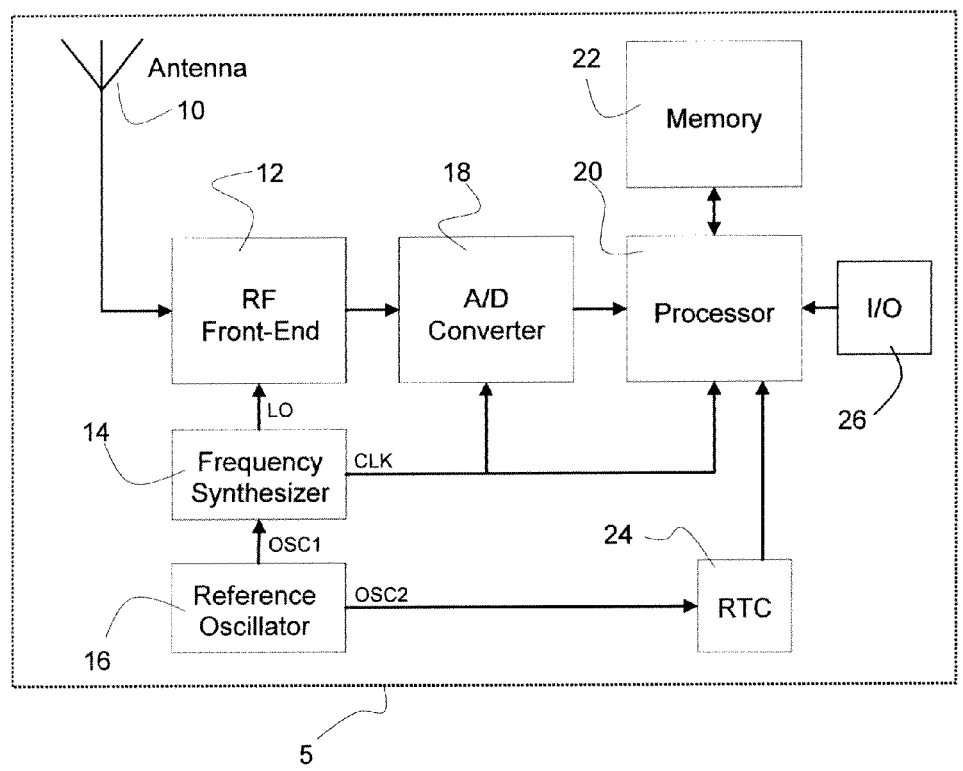
FIG. 1 is a block diagram of a GPS receiver that operates in accordance with a first embodiment of the invention.

A first embodiment of the invention will now be described, which relates to position determination using satellite positioning. In this embodiment, the electronic device is a GPS receiver as shown in FIG. 1. It is operable to receive a radio signal containing transmissions from GPS satellites. Whereas a conventional GPS receiver would completely process the received signal to determine a position fix, the GPS receiver of FIG. 1 processes the received signal only to the extent necessary to evaluate the plausibility of each of a plurality of candidate positions (that is, hypotheses about the position of the device). It then outputs an indication of the hypothesis that is most likely to be true.

Details of the operation of the conventional parts of a GPS receiver, such as that shown in FIG. 1 will be well known to those skilled in the art. A general overview is given in WO 2009/000842, for example.

FIG. 1 shows a GPS receiver operating in accordance with the first embodiment of the invention. The GPS receiver 5 comprises an antenna 10 coupled to an RF front-end 12. The RF front-end 12 includes circuitry for amplifying GPS signals received via the antenna 10. It also includes filtering circuits for attenuating out-of-band interference; and a mixer. The mixer multiplies the received signals with a local oscillator (LO) signal that is produced by a frequency synthesizer 14, to generate signals at sum and difference frequencies. Frequency synthesizer 14 is driven by a high-frequency output OSC1 produced by a reference oscillator 16. In the present embodiment, the high-frequency output OSC1 of the reference oscillator 16 operates at a frequency of 26 MHz. After further appropriate filtering, the mixing operation in the RF front-end 12 yields an intermediate frequency (IF) signal that is input to analogue-to-digital (ND) converter 18. The signal samples generated by the ND converter 18 are output to processor 20 for processing. Both A/D converter 18 and processor 20 are clocked by a high-speed clock output CLK generated by the frequency synthesizer 14. Note that the analogue circuits of the RF front-end 12 and the A/D converter 18 may be of conventional types, such as will be well known to the skilled person.

Note that the A/D converter 18 may comprise a pair of A/D converters in order to transform the real and imaginary parts of a quadrature IF signal into the digital domain. In this case, the connection between the front-end 12 and A/D converter 18 may be a complex I/Q connection. Likewise, the signal samples output by the A/D converter 18 may represent quadrature signals. However, this does not affect the implementation of the present invention and those skilled in the art will already be familiar with the manipulation of quadrature I/Q analogue and digital signals.

In the present embodiment, the processor 20 processes the samples received from the A/D converter 18 immediately as the signals are received and sampled. This processing will be described in greater detail below.

A real-time clock (RTC) 24 is also provided to keep track of the current time. This allows determination of the approximate time at which signals have been received. RTC 24 is driven by a second output OSC2 produced by the reference oscillator 16. However, since the RTC 24 runs at a slower rate than that required of the frequency synthesizer 14, a frequency divider is used within the reference oscillator 16 to provide the low-frequency output OSC2. In this way, the reference oscillator 16 acts as a master oscillator generating a master clock signal from a single quartz crystal, to which both the frequency synthesizer 14 and the RTC 24 are synchronised. In the present embodiment, the low-frequency output OSC2 of the reference oscillator 16 operates at a frequency of approximately 26 kHz, which implies a frequency divider ratio of around one thousand.

Note that the processor 20 may be implemented as a bespoke hardware device, such as one or more application specific integrated circuits (ASICs). Alternatively, the processor 20 may comprise one or more general purpose processing units or digital signal processors (DSPs) which have been suitably programmed. Implementation of either alternative will be well within the capabilities of those skilled in the att.

An Input/Output (I/O) device 26 is coupled to the processor 20. This enables user control of the GPS receiver 5 as well as output of the candidate(s) selected as most plausible, after they have been evaluated. In this embodiment, the I/O device consists of a keypad, for user input, and a display, for output.

Figure 2:
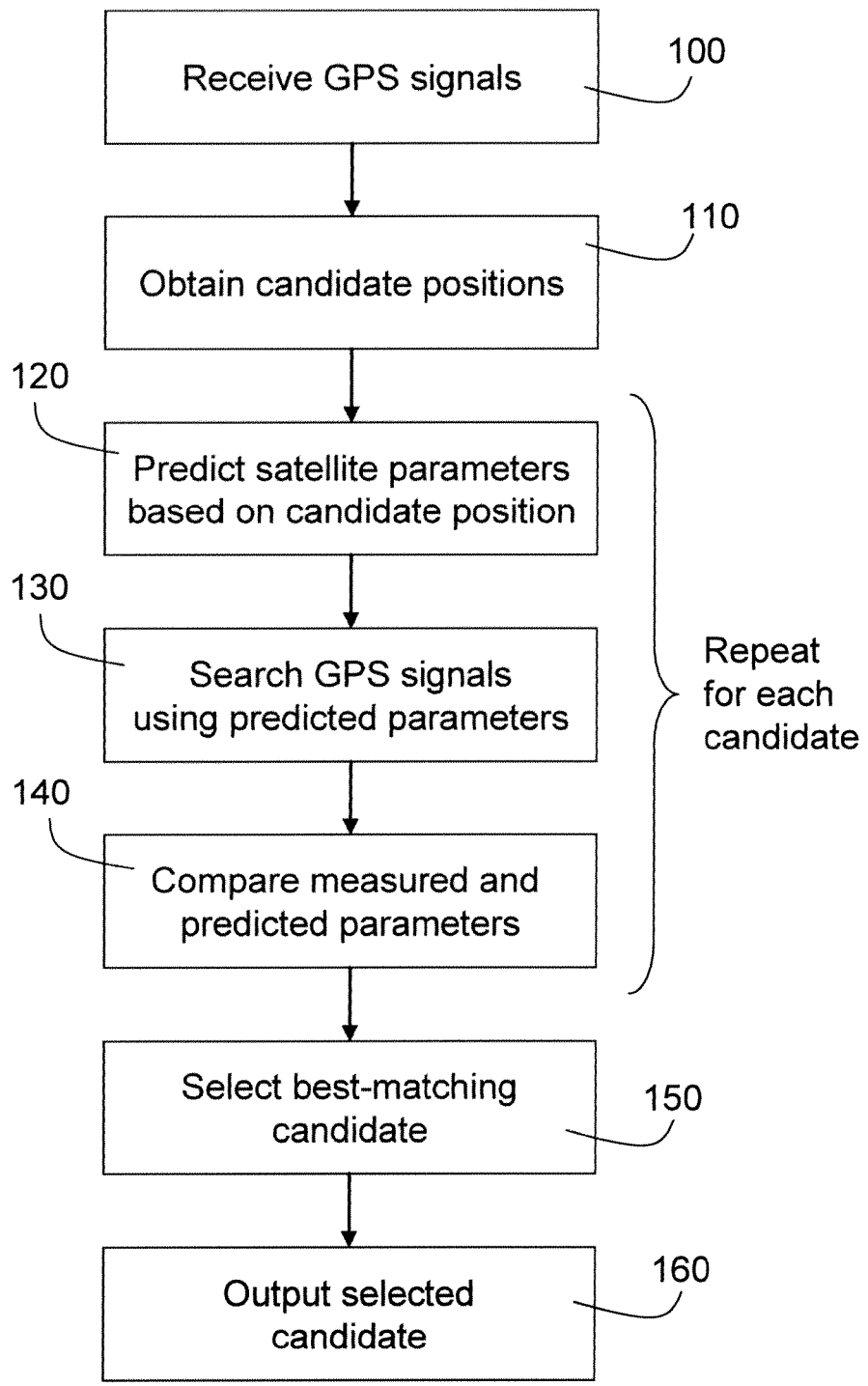
FIG. 2 is a flowchart of a method of determining position according to the first embodiment.

FIG. 2 is a flowchart illustrating a method according to the first embodiment. At step 100, the GPS receiver receives GPS signals, using the antenna 10 and RF front-end 12. The resultant IF signal is digitised by the A/D converter 18 and signal samples are output to the processor 20.

Separately, in step 110, the processor 20 obtains candidate positions, each of which represents a hypothesis about the true position of the receiver 5. In this example, it is assumed that two candidate positions are obtained. Of course, the same method can be extended to greater numbers of hypotheses. The candidates are obtained from the memory 22 of the GPS receiver 5. It is known for a GPS receiver to store a list of "favourite" locations, which are regularly visited by a user. In this example, the candidate positions are obtained by selecting the most frequently used favourites. It is assumed that these positions correspond to the home of the user and his/her workplace. Each candidate position comprises latitude and longitude coordinates. Each candidate is also associated with a timestamp, provided by the real-time clock 24. It is assumed that the time hypothesis is the same across all candidates, because the position to be determined is the position of the electronic device at a unique instant in time. Furthermore, since the device is assumed to have no other way to estimate the time, there is no other competing hypothesis.

In steps 120, 130 and 140, the processor 20 evaluates each hypothesis, by assessing which, if any, of the candidates is consistent with the content of the received GPS signals. To do this, the processor predicts, in step 120, one or more satellite-parameters that it would expect to observe if the device was located at the candidate position at the estimated time. It then searches, in step 130, the received, digitised signal samples to measure the corresponding observed parameters. Since the processor 20 is searching for specific, predicted parameters, it can search more efficiently by targeting the search according to the prediction. The parameters measured in step 130 are then compared, in step 140, with the predicted parameters obtained in step 120.

Steps 120, 130 and 140 are executed for each hypothesis. Finally, in step 150, the processor selects the hypothesis for which the predicted and measured parameters match most closely. This selected hypothesis is output (in step 160) via the input/output interface 26, by displaying the result on a display.

When evaluating each hypothesis, in steps 120-140, various parameters of the satellites and their transmissions may be used to check whether the hypothesis is consistent with the received signal. Several illustrative examples will now be described.

Example 1

Visibility of Satellites

Based on each position hypothesis, the processor predicts, in step 120, the satellites that should be visible. Here "visibility" means that the transmitted signals from that satellite are detectable in the radio signal received at the receiver 5. Satellites which are above the horizon (when viewed from the candidate position) should be visible. Therefore, predicting which satellites are visible comprises determining the satellites which are above the horizon at the time and position hypothesised. This can be done using knowledge of the orbital motion of the satellites, which can be obtained from the "almanac" data broadcast by all of the satellites, or the more accurate "ephemeris" data broadcast by each satellite, describing its own trajectory. The almanac and/or ephemeris data can be obtained by decoding a satellite's data message over a sufficiently long period. Alternatively, in a technique known as Assisted GPS (AGPS), this information may be provided over a separate communications channel. Note that even relatively old almanac or ephemeris data can be used to predict visibility. Data outside its normal period of validity may be somewhat inaccurate; however, small inaccuracies will be unlikely to significantly affect a coarse prediction such as whether or not the satellite is above the horizon. A margin of error can be used to exclude satellites near the horizon from consideration, for example.

The set of satellites predicted to be visible will be a subset of the full constellation of up to 32 GPS satellites. According to the design of the GPS system, there should always be at least 4 satellites visible, at all sites on the globe. However, there will often be more than 4 available.

Using the subset of GPS satellites that are predicted to be visible, the processor 20 then processes, in step 130, the GPS signal samples to try to detect the corresponding satellite signals. A satellite signal can be detected by correlating a copy of the spreading code for that satellite with the received samples. In general, it is necessary to search for a match over a range in both time and frequency. Therefore, the search is computationally intensive. In this example, the processor reduces its computational effort by searching only for those satellites that have already been predicted to be visible.

This step 130 will be performed for each hypothesis. However, it is only necessary to search for each satellite once. Note that some satellites may be predicted to be visible at more than one of the hypothetical positions. These satellites will be less useful for discriminating among the hypotheses. Therefore, if possible, it may be preferable to search first for satellites that are unique to a proper subset of the hypotheses. This should enable the receiver to discriminate between the hypotheses as quickly and effectively as possible. For example, if satellites 1, 4, 6, and 20 are predicted to be visible from the "home" location and satellites 4, 6, 18, and 20 are predicted to be visible from the "office" location, the processor may prioritise the search for satellites 1 and 18.

The processor will then compare, in step 140, the list of satellites that were predicted with the list of those found. It will select, in step 150, the most likely hypothesis, based on the results. This selection may be based on the absolute number of predicted satellites that were found, or the proportion of the predicted satellites that were found, or some other similar metric. The (absolute or relative) number of satellites found may be used as a confidence measure, which indicates how likely it is that the hypothesis is true. This indicator may be output together with the selected hypothesis.

The processor may also search the digitised signal samples for satellites which were not predicted to be visible. However, it may devote comparatively less effort to this task—for example, a shorter integration time may be used in the correlation-search for unexpected satellites. This search would therefore be less sensitive than the search for expected visible satellites and would find only relatively strong satellite signals. Finding a strong satellite signal that is not predicted to be visible suggests that the hypothesis is incorrect. Therefore, the number of unexpected satellite signals found may be used as a measure of the likelihood that the hypothesis is false. This "falsity" measure may also be output together with the selected hypothesis. Alternatively, a third measure may be constructed which expresses the relative values of the confidence measure and the falsity measure. For example, the ratio of the confidence measure to the falsity measure may be output.

Note also that if the search for expected signals is sensitive, a search for unexpected signals may be necessary to avoid cross-correlation problems. It is an unavoidable side-effect of spreading-codes, such as those used by GPS, that a signal can be detected using the wrong spreading-code, although the apparent signal strength will be considerably weaker. This occurs because in practice the cross-correlation between the codes used by different satellites is non-zero. In the case of the GPS L1 C/A code it is common to be able to detect the wrong signal at levels about 25 dB weaker than when using the correct spreading code. Therefore, when searching for the spreading-code of a given satellite SV1, even if that satellite's transmissions are not present in the radio signal the receiver may still appear to detect it weakly via a cross-correlation with the spreading-code of a different satellite SV2 (which happens to be visible and relatively strong). Mitigation against cross-correlation is known in the art—it typically involves searching for all possible SV signals. The search can use a relatively short integration time, because only strong signals are of interest, with the result that this search can be relatively quick. Any weak signals subsequently detected that share the same characteristics (for example Doppler shift, code phase, and the like) can be discounted as duplicates of the stronger signals.

In general, assessing the likelihood that a hypothesis is false is useful, because sometimes none of the hypotheses will be true. That is, the GPS receiver 5 might not be located at any of the candidate positions. It is desirable to output an indication that this is the case.

Often, candidate positions will be too close together to distinguish them on the basis of satellite-visibility alone. In general, in order for significantly different sets of satellites to be predicted as visible, the candidates would need to be widely spaced apart. So, while the visibility of satellites may enable a location in England to be distinguished from a location in Switzerland, for example, it might not enable two locations in England to be distinguished from one another. In this case, further processing will be necessary, such as that described in one of the following examples.

Example 2

Signal Strength

Optionally, in addition to comparing the predicted and observed lists of visible satellites the processor 20 could also compare the relative strengths of the signals received from each visible satellite. Signal strength can be measured by Signal-to-Noise Ratio (SNR). Signal strength will vary dependent on the angle of elevation of a satellite above the horizon (among other factors). Therefore, it may be possible to distinguish one position from the other by comparing measured and predicted signal strengths. WO 2010/032057 describes models for predicting SNR dependent on angle of elevation. Note that the antenna gain pattern of the antenna in the GPS receiver should also be taken into account. Preferably, the antenna will be disposed in a fixed orientation—for example, the main lobe of the antenna of an in-car navigation system may point vertically upwards, and may be substantially without variation in the azimuth direction. This will mean that the direction in which the car is pointing will not affect the observed signal strengths.

Note that minimal additional processing is needed, compared with Example 1. Assuming the correlation-based search for a satellite signal has already been performed, the signal strength can be derived from the magnitude of the peak in the correlation function.

Example 3

Doppler Shift

As noted above, searching for the signal of a specific satellite generally involves searching at a range of time delays (code-phases) and frequencies. The frequency uncertainty is caused by several factors including: systematic offset or drift of the frequency of the reference oscillator 16; and Doppler shift, due to relative motion between the satellite and the receiver. The systematic offset or drift will be the same for all satellites. Meanwhile, the relative frequency differences observed between individual received satellite signals will be characteristic of the relative velocities between the satellites and the receiver. Based on knowledge of the trajectories of the satellites, the processor can predict, in step 120, the Doppler shift for each satellite expected to be visible, at each candidate position. It can then compare, in step 130, the observed frequencies of each satellite signal with the predicted Doppler shifts to determine which are most consistent.

Note that minimal additional processing is needed, compared with Examples 1 and 2 above. Assuming the correlation-based search for a satellite signal has already been performed, the observed frequency of the satellite's signal is already known from the position of the peak in the correlation function, in the frequency dimension.

Example 4

Ranging Measurements

In some cases, none of the above techniques will provide sufficient discrimination to separate the candidates. Alternatively, it may be desired to have a high level of confidence in the selection of a candidate (or rejection of all candidates). In such cases, the following, more detailed evaluations of each hypothesis may be desirable.

It will be assumed, for this example, that two candidate positions produce the same list of expected satellites and that all of the expected satellites have been found in the samples of the received radio signal.

The processor 20 predicts, in step 120, pseudoranges for at least two satellites, for each candidate position. This can be done by determining the orbital position of each satellite, and calculating the distance from that orbital position to the candidate position, using the following equation:

$$(X_s - X_h)^2 + (Y_s - Y_h)^2 + (Z_s - Z_h)^2 = R_p$$

Here, X, Y, and Z are spatial coordinates in three dimensions; the subscript S denotes the position of a satellite; and the subscript h denotes one of the hypothetical positions. $R_p$ is the predicted range between the satellite and the hypothetical position.

The processor 20 then measures the actual pseudoranges for those satellites, in the conventional manner. Note that when measuring the real pseudoranges, the predicted pseudoranges can be used as a starting point. For example, the code-phase of the spreading code, the timing of the bit-edge of the satellite data message, and/or the bit-position in the data message can all be predicted. Nevertheless, the extent to which these predictions can help the search will depend on the timing accuracy of the receiver (as well as whether the receiver is at the candidate location). If the time estimate at the receiver is very accurate, then it will be possible to predict very accurately what signals are expected to be arriving at the candidate location at that instant. If the time estimate is inaccurate, the prediction will be similarly inaccurate. To the extent that there is inaccuracy, it will be necessary to search within a finite range of uncertainty either side of the prediction. However, once one satellite signal has been detected, the starting point for the search for the next signal can be adjusted relative to the detected timing of the first signal. The search range for subsequent signals may also be narrowed, since the processor will expect to find these other signals at a specific offset with respect to the first-detected signal, if the hypothesis is true—or, if the hypothesis is false, it will not find them at all.

The processor compares, in step 140, the predicted and measured pseudoranges. Note that, in general, the pairs of values will not be equal, because of the timing (and therefore range) uncertainty in the measured values. However, this can be accommodated by testing whether the timing (or range) bias is the same with respect to both satellites. This can be done by evaluating the following equation twice:

$$R_p = R - \Delta R$$

Here, R is the measured pseudorange and ΔR is the offset (between pseudorange and predicted range) due to timing error at the receiver. If the equation is evaluated twice, for different satellites, the same offset should result in both cases. Different offsets indicate that the measured pseudoranges are incompatible with the hypothesis. Higher confidence in the result may be obtained by evaluating the equation for more than two satellites.

Note that in some cases, it may be unnecessary to calculate full pseudoranges. Other ranging measurements may be sufficient to discriminate among the different hypotheses. For example, code-phase information characterises the relative timing of a satellite's transmitted signal to within each repetition of the spreading code. A code-phase, by itself, does not provide a complete ranging measurement, because it remains unknown which repetition of the spreading code has been observed. However, a set of code phase measurements may be sufficient to distinguish between the two different hypotheses.

If a code-phase is insufficient, a small amount of additional information may be sufficient. For example, the position of the bit-edge of the satellite's data message may be detected and used to provide a further set of constraints which may be compared against the prediction.

In a further extension of this approach, the position of a specific sequence of bits in the satellite data message may be predicted based on each hypothetical position and the estimated time. These predictions can than be compared against actual demodulated portions of the data message.

Note that, in all these cases, where a ranging measurement or part of a ranging measurement is predicted based on a hypothesis, that prediction can be used to accelerate the actual measurement of the ranging measurement, because the search can prioritise measured values near to the predicted value.

Note that, in each of the cases described above, it was not necessary to calculate a position fix in order to select among the hypotheses. Indeed, in many cases, it will be possible to confirm or reject each hypothesis with a high degree of confidence even though there may not be sufficient information to calculate a position fix in the conventional fashion. For example, a hypothesis can be confirmed or rejected by predicting and measuring pseudoranges to two satellites, as described above. In contrast, it is generally impossible to calculate a unique position fix using signals from just two satellites.

In other embodiments, a method of position validation according to the present invention may be used as a precursor to calculating a complete position fix. For example, an electronic device may use the presently described methods to quickly establish a hypothesis that is likely to be true, before proceeding to calculate a precise position-fix more slowly, or only if explicitly requested by the user or a software application.

In some embodiments, a method of validating hypotheses according to the present invention may be used as a first step of a positioning method. If none of the hypotheses is accepted with sufficient confidence, the method may conclude that none of the hypotheses are true and may therefore proceed to a second step wherein it calculates a position fix using satellite signals in a conventional way.

As will be apparent by now to those skilled in the art, the examples described above are not mutually exclusive and can be combined with one another, with beneficial effect.

In a more sophisticated embodiment of the invention, the evaluation of the hypotheses can be optimised to minimise the (expected) computational burden. Some hypotheses may be inherently more likely than others. If information about the prior probability of each hypothesis is available, this can be used to choose the ordering of the evaluation process. The last known position of the device usually provides a very likely hypothesis, for example, because the device may be static or slowly moving (relative to the distance between hypotheses). This likely hypothesis is evaluated first (using methods like those explained in the numbered examples above). Often, this hypothesis will be correct, and can be validated quickly and easily. The other hypotheses can then be checked briefly, if necessary, to ensure that there is no evidence to contradict the first hypothesis. Apart from being prioritised in this way, the last known position can be evaluated in the same way as any other hypothesis.

When evaluating a hypothesis, if evidence is found to contradict the hypothesis, the method may immediately proceed to evaluating another hypothesis. Using the scenario of Example 1: satellites 1, 4, 6, and 20 are predicted to be visible from a hypothesised location A. If the correlation search fails to detect satellite 1, the method may immediately proceed to test another hypothesised location B, rather than continuing to search for the satellites 4, 6, and 20. That is, location A may be discounted immediately based on the absence of a signal from satellite 1.

In the embodiments described above, the radio signal was processed immediately upon reception, to assess the consistency of the information obtained from the radio signal with each hypothesis, and thereby determine the most likely position of the electronic device. However, those skilled in the art will appreciate that information about the radio signal could instead be stored for later processing. This later processing may be performed by the same device that received the radio signal, or another device.

In the first embodiment above, the GPS receiver 5 of FIG. 1 was adapted to process digitised GPS signal samples immediately upon receipt. In variations of this embodiment, the GPS receiver may be adapted to store data in the memory 22, instead of processing it. A GPS receiver of this type is known in the art as a "Store-and-process-later" receiver or "Capture-and-Process" receiver.

In one such embodiment, the data stored in the memory 22 comprises the raw samples of IF signals provided by the A/D converter 18. That is, processing to detect satellite signals and calculate ranging measurements is not performed before the samples are stored. However, in other embodiments additional processing may be performed on the samples and the resulting data stored in the memory 22. That is, instead of storing the received radio signals themselves (in the form of digitised samples), the signals may be analysed and the information obtained about the contents of the signals may be stored in the memory 22. By way of example, the information stored in the memory may comprise, for one or more satellite-signals, one IS or more of: detected signal strength; code-phase; observed frequency; carrier-phase; bit-edge timing; several bits of the data message; or pseudoranges.

Note that processing the received radio signal and storing the extracted information, followed by later processing the extracted information to evaluate the hypotheses, may be inefficient. This is because knowledge of the hypotheses can be used to accelerate the initial processing of the received signal (as explained in the earlier examples, above). Therefore, when using a "Capture and Process" GPS receiver it may be preferable to store the "raw" digital samples of the received radio signal. Then, these samples can be processed later, to simultaneously extract the necessary information and evaluate each hypothesis.

Techniques according to the present invention may be useful for electronic devices which are configured to operate differently according to the location at which they are being used. The locations at which the device is configured operate in a special way can be used as the hypotheses for the method.

In some applications, there may be an equal balance of importance between different hypotheses. For example, if a mobile phone is configured to use a ringtone for personal calls when at home and a silent/vibrate alert for personal calls while at the office, the user may associate equal inconvenience with misclassifications of all kinds. That is, the user may be equally unhappy if the phone rings by mistake, while at the office, or alerts silently by mistake, while at home.

In other applications, some types of error may be more costly than others. For instance, it may be necessary to be very sure that the device is at a particular location. Alternatively, it may be necessary to be very sure that the device is not at a particular location. The following practical examples illustrate this:

1. A mobile phone should not be operated in a hospital or other known safety-critical area. Thus, the deduction method for establishing the location of the device should have a very high level of confidence before reporting that the device is not in a safety-critical area. In other words, the deduction method should err on the side of caution. The device should have strong evidence that it is not in the specified area and no contrary evidence that it is in fact in the specified area. If the hypothesis "In Hospital" is associated with a likelihood value of truth and a likelihood value of falsity, the method may apply a low threshold to the likelihood of truth and a high threshold to the likelihood of falsity. In this way, it is unlikely to mistakenly conclude that the device is not at the hospital. (It may more often mistakenly conclude that the device is at hospital, but this is regarded as a less costly error.)

2. Confidential data files should only be opened in the office. Therefore, the device should have a high level of confidence that it is at the office before allowing access to these files. The cost of mistakenly concluding that it is at the office is high. The method should therefore require strong evidence that the device is at the specified location and an absence of contrary evidence that it is in fact outside the office. The contrary evidence may be evidence against the hypothesis that the device is at the office or evidence in favour of another, incompatible hypothesis.

While the invention has been illustrated and described in detail in the drawings and foregoing description, such illustration and description are to be considered illustrative or exemplary and not restrictive; the invention is not limited to the disclosed embodiments.

For example, the candidate positions (hypotheses) can be obtained from any suitable source. This may include previous manual user input or configuration during a set-up phase, or input to the positioning device from some other hardware device. Equally, the candidate positions may be provided by a software application running on an electronic device, to a positioning sub-system incorporated in that device.

In some circumstances, the present invention can be used to protect or obscure the precise physical locations underlying each hypothesis. This can be useful for data protection or privacy purposes, as noted previously above. In one such embodiment, the memory 22 contains a look-up table which associates each of a plurality of position hypotheses with a label. These labels are used by the input/output device 26 to refer to the hypotheses. Thus, when a hypothesis is selected by the method and is output via I/O interface 26, only the label is identified. The actual underlying geographical coordinates remain hidden. The hypotheses may also be input using their labels. For example, the user may input the hypotheses "at home"; "at the office"; and "at my friend's house" via the user interface. The processor 20 receives this input and translates it into geographical coordinates, using the look-up table stored in the memory 22. The associations between the labels and the coordinates may have been predefined during a configuration phase of the device. For example, password authentication may be required to create or edit the lookup table in the memory 22. When the one or more of the hypotheses have been selected by the positioning method, the processor 20 looks up the associated labels in the memory 22 and outputs these via the I/O interface 26.

The embodiments described previously above have concentrated on an implementation using GPS L1 signals. However, the techniques described can also be applied with other GPS signals (for example the L2 or L5 signals) or can be used with other satellite positioning systems, such as the European Union's Galileo system or the Russian system GLONASS. In some embodiments, signals from a combination of two or more different GNSS services may be exploited to evaluate hypotheses. This may be advantageous, for example, if an incomplete set of signals is received from each individual service, such that it would not be possible to calculate a position fix (or satisfactorily evaluate hypotheses) using any one service. Exploiting signals from different satellite constellations (of the different GNSS services) will in general increase confidence in the results, when evaluating a hypothesis.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The functions may be performed in a single integrated electronic device, or the functions may be distributed across different discrete devices. For example, some functions may be performed by a remote service accessed via a wired or wireless network connection. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining an indication of the position of an electronic device, the method comprising:
   obtaining (100) information relating to a radio signal received by the device, the radio signal comprising transmissions from one or more satellites of a satellite-positioning system, from which information an inference can be made about the true position of the device at the time the signal was received;
   obtaining (110) a plurality of different hypotheses about the true position of the device, wherein each hypothesis comprises at least one of:
   a position in two or more spatial dimensions;
   a set of positions; and a range of positions;

evaluating (120, 130, 140) the plurality of hypotheses, comprising assessing a degree of consistency between the information relating to the radio signal and the hypotheses;

based on the outcome of the evaluations, selecting (150) one or more of the hypotheses; and outputting (160) an indication of the selected one or more hypotheses.

2. The method of claim 1 wherein the one or more hypotheses that are selected are those that are determined to be:
- most likely to be true;
- least likely to be false;
- most likely to be false; or
- least likely to be true.

3. The method of claim 1 wherein evaluating the plurality of hypotheses comprises searching (130) the signal to detect transmissions from at least one satellite, wherein at least one parameter of the search is dependent on at least one of the hypotheses.

4. The method of claim 3 wherein, during the search (130), priority is given to detecting a transmission from a satellite which is predicted to be detectable at a position according to a first one of the plurality of hypotheses.

5. The method of claim 3 wherein, during the search (130), priority is given to detecting a transmission from a satellite which is predicted not to be detectable at a position according to a second one of the plurality of hypotheses.

6. The method of claim 3 wherein the at least one parameter of the search (130) comprises at least one of:
- a predicted frequency of a transmission from the at least one satellite;
- a predicted Doppler shift of such a predicted frequency;
- a known spreading code used by the at least one satellite;
- a predicted timing with which a signal transmitted by the at least one satellite is received;
- a predicted signal strength with which such a signal is received; and
- a predicted pattern of bits in the data-message of the at least one satellite.

7. The method of claim 1 wherein evaluating the plurality of hypotheses comprises:
- predicting (120) the value of at least one parameter of the received radio signal, based on at least one of the hypotheses; and
- comparing (140) the predicted value with a corresponding measured value of the parameter.

8. The method of claim 7, wherein the step of evaluating the plurality of hypotheses further comprises, before predicting the value of the at least one parameter:
- comparing the hypotheses in order to determine which one or more of a plurality of parameters is or are most likely to discriminate among the hypotheses; and
- choosing the at least one parameter to be predicted according to the result of the determination.

9. The method of claim 1, wherein:
- each hypothesis has associated with it a prior probability that it is true; and
- the step of evaluating the plurality of hypotheses comprises evaluating the hypothesis with the highest probability first.

10. The method of claim 1, wherein the one or more hypotheses most likely to be true are selected and output before a complete position fix has been calculated from the radio signal.

11. The method of claim 1, wherein outputting an indication of the selected one or more hypotheses further comprises outputting at least one of:
- a first value indicating the likelihood that the hypothesis is true;
- a second value indicating the likelihood that the hypothesis is false; and
- a third value indicating the relative magnitudes of the first and second values.

12. A non-transitory computer readable medium for storing a computer program for determining an indication of the position of an electronic device, wherein the program is adapted to perform the following steps when said program is run on a computer:
- obtaining (100) information relating to a radio signal received by the device, the radio signal comprising transmissions from one or more satellites of a satellite-positioning system, from which information an inference can be made about the true position of the device at the time the signal was received;
- obtaining (110) a plurality of different hypotheses about the true position of the device, wherein each hypothesis comprises at least one of:
  - a position in two or more spatial dimensions;
  - a set of positions; and a range of positions;
- evaluating (120, 130, 140) the plurality of hypotheses, comprising assessing a degree of consistency between the information relating to the radio signal and the hypotheses;
- based on the outcome of the evaluations, selecting (150) one or more of the hypotheses; and
- outputting (160) an indication of the selected one or more hypotheses.

13. Apparatus for determining an indication of the position of an electronic device, the apparatus comprising:
- a satellite positioning receiver (10, 12, 18), operable to receive a radio signal, the radio signal comprising transmissions from one or more satellites of a satellite positioning system;
- an input (26), for obtaining a plurality of different hypotheses about the true position of the device, each hypothesis comprising at least one of:
  - a position in two or more spatial dimensions; a set of positions; and a range of positions; and
- a processor (20), adapted to:
  - evaluate the plurality of hypotheses, comprising assessing a degree of consistency between the received radio signal and the hypotheses;
  - based on the outcome of the evaluations, select one or more of the hypotheses; and
  - output an indication of the selected one or more hypotheses.

* * * * *